UNITED STATES PATENT OFFICE.

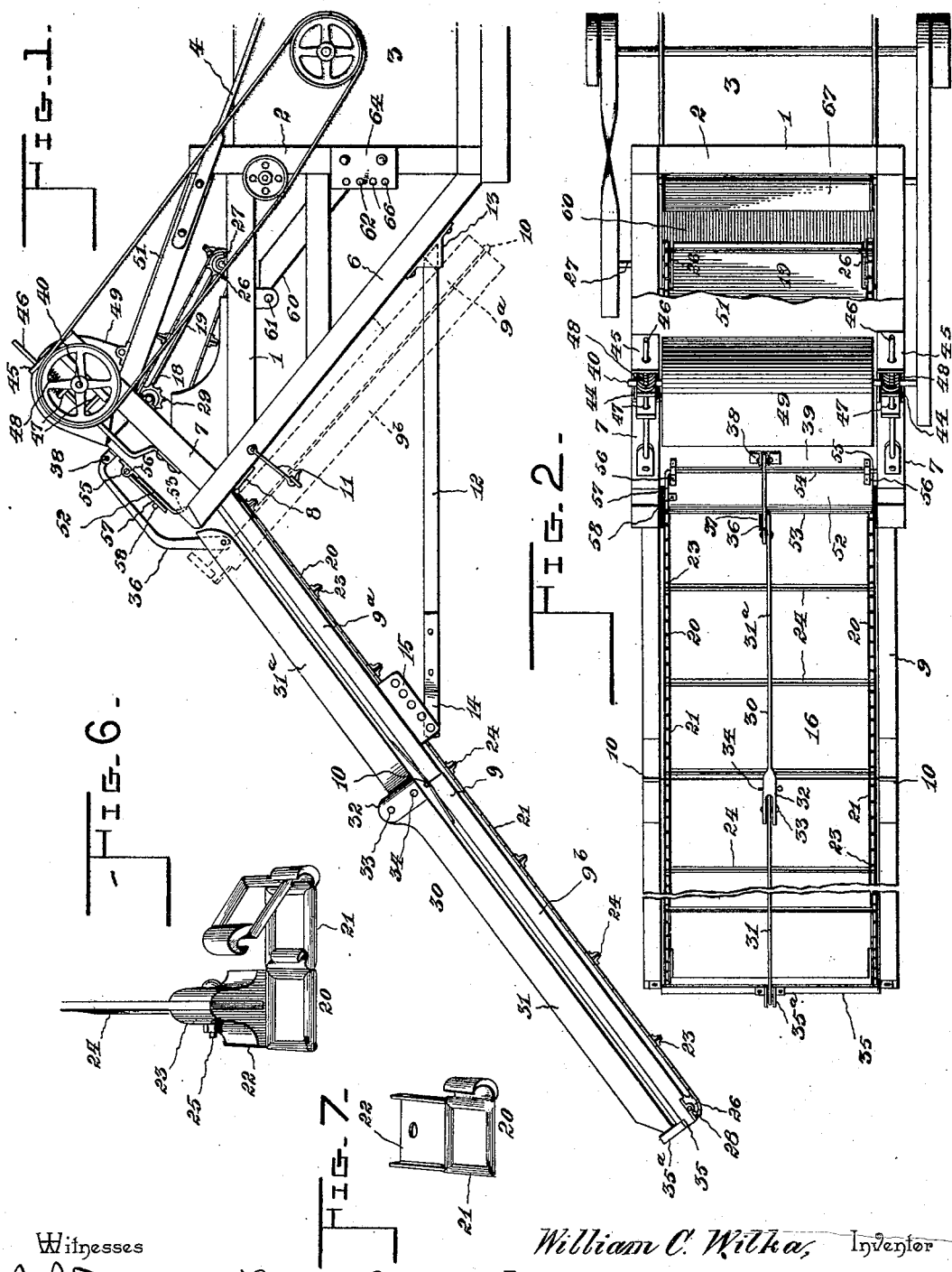

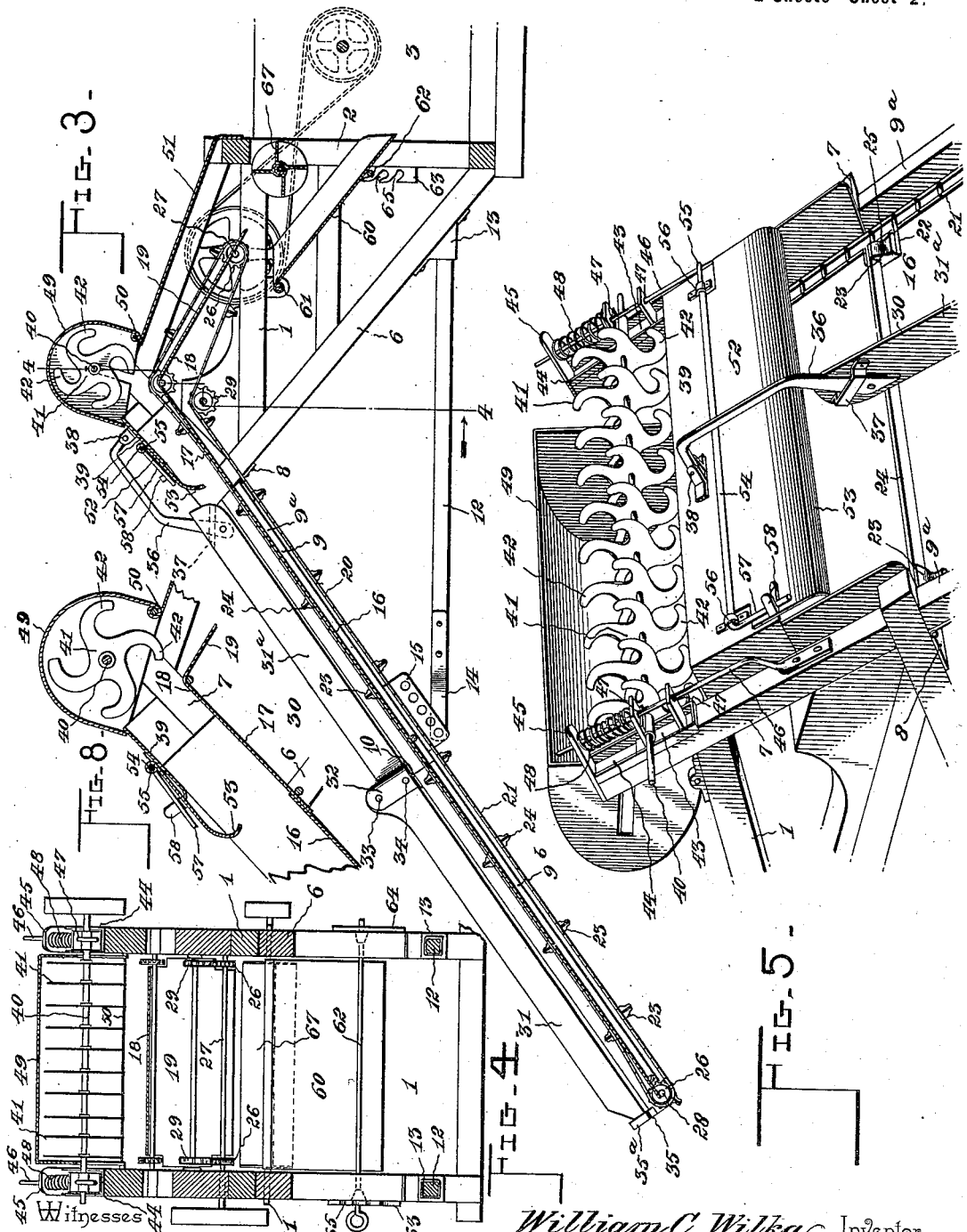

WILLIAM C. WILKA, OF ROCK RAPIDS, IOWA.

BAND-CUTTER AND FEEDER.

SPECIFICATION forming part of Letters Patent No. 639,839, dated December 26, 1899.

Application filed April 28, 1899. Serial No. 714,890. (No model.)

*To all whom it may concern:*

Be it known that I, WILLIAM C. WILKA, a citizen of the United States, residing at Rock Rapids, in the county of Lyon and State of Iowa, have invented a new and useful Band-Cutter and Feeder, of which the following is a specification.

This invention relates to band-cutters and feeders for threshing-machines; and it has for its object to effect certain improvements in machines of this character whereby the bundles or sheaves of grain will be released from the band and evenly distributed to the cylinder and concave of the thresher.

To this end the invention contemplates a novel arrangement of the bundle-carrier frame with reference to the cutting mechanism and the distributing devices, whereby the bundles are delivered to the cutting mechanism in a manner to insure the severing of the bands, while at the same time permitting the cutting mechanism to act in the capacity of a separator and distributer for the loosened bundles, whereby a uniform distribution of the grain to the thresher is secured.

A further object of the invention is to provide simple and efficient means for separating the bundles on the bundle-carrier and preventing the same from twisting out of position before reaching the cutter; and another object of the invention is to equip the machine with an improved bundle-trap or arresting device, which prevents more than one bundle at a time passing to the cutter, and thereby overcrowding the same.

With these and other objects in view, which will readily appear as the nature of the invention is better understood, the same consists in the novel construction, combination, and arrangement of parts hereinafter more fully described, illustrated, and claimed.

While the essential features of the invention are necessarily susceptible to modification without departing from the spirit or scope thereof, still the preferred embodiment of the several improvements is shown in the accompanying drawings, in which—

Figure 1 is a side elevation of a band-cutter and feeder shown in its applied position on the cylinder end of a threshing-machine casing. Fig. 2 is a top plan view thereof. Fig. 3 is a vertical longitudinal sectional view of the same. Fig. 4 is a vertical transverse sectional view on the line 4 4 of Fig. 3. Fig. 5 is an enlarged detail in perspective, showing more plainly the mounting of the carrier-shaft and the bundle-trap or arresting device. Figs. 6 and 7 are details in perspective of a section of one of the bundle-carrier sprocket-chains, showing the manner of fitting the slats thereto. Fig. 8 is an enlarged detail sectional view showing more plainly the relative positions of the cutter, the arched bed for supporting the bundles being acted upon by the cutter, and the bundle trap-or arresting device.

Like numerals of reference designate like and corresponding parts in the several figures of the drawings.

Referring to the drawings the numeral 1 designates the supporting-frame of the machine, which is provided with an inner vertical side portion 2, which registers flat against the cylinder end of a threshing-machine casing 3, and the supporting-frame is held in this position preferably by means of the fastening strips or braces 4, rigidly fastened to opposite sides of the contiguous end portion of the threshing-machine. Fastening-bolts or other equivalent fastening devices may also be used to supplement the strips or braces 4 to provide for rigidly securing the supporting-frame 1 on the casing or framework of the threshing-machine. The supporting-frame 1 of the machine is further provided with an inclined lower side 6 and with an inclined outer end portion 7, and to the outer end portion of the supporting-frame is hinged, as at 8, the inner upper end of the inclined carrier-frame 9. The said inclined carrier-frame 9 is not only hinged at its inner upper end, as at 8, to the outer end portion of the supporting-frame 1, but also consists of separate folding sections 9ª and 9ᵇ, connected together at their meeting ends by the hinge-joints 10, whereby the two sections of said frame may be folded together and also swung beneath the inclined lower side 6 of the supporting-frame and held in such position by the hook and eye or similar fastenings 11, as plainly shown by the dotted lines in Fig. 1 of the drawings.

The sections of the carrier-frame are folded together out of the way when the machine is not in use; but when the machine is set up for operation the sections of the carrier-frame are suspended, so that the carrier-frame inclines downwardly from the supporting-frame and is sustained in such position by means of a pair of oppositely-arranged adjustable brace-bars 12. The brace-bars 12 are detachably fitted at their inner ends in the sockets 13, secured to the inclined lower side bars of the supporting-frame 1, and the outer ends of the said bars have an adjustable connection 14 with perforated keeper-plates 15, fastened to the under side of the inner carrier-frame section 9ª contiguous to the hinge-joint 10.

The platform 16 of the downwardly-inclined carrier-frame 9 extends the entire length of such frame and substantially alines with the outer inclined apron 17 of the arched or inverted-V-shaped bed 18, fitted within the outer end portion of the supporting-frame 1 to provide a support for the bundles being acted upon by the cutting mechanism hereinafter referred to, and by reason of its inverted-V-shape construction the arched supporting-bed 18 is provided at the inner side of its apex with the downwardly-inclined distributing-apron 19, over which the loosened grain passes after the bands are cut from the bundles.

From the foregoing it will be seen that the arched supporting-bed 18 within the supporting-frame 1 forms a substantial continuation of the inclined platform 16 of the carrier-frame, and associated with said supporting-bed and platform is an endless bundle-carrier 20, the upper run of which travels over not only the platform of the carrier-frame, but also said supporting-bed 18, throughout the entire length of the latter. The endless bundle-carrier 20 essentially consists of a pair of parallel oppositely-arranged sprocket-chains 21, certain of the links of which are provided with integral offstanding flanged ears 22, in which are seated the upright bifurcated blocks 23, and in the bifurcation of said blocks 23 the flat carrier-slats 24 are inserted edgewise and held therein by the fastening bolts or rivets 25. The flat transverse slats 24 of the endless bundle-carrier, which are fastened to the opposite sprocket-chains in the manner described, are arranged at regularly-spaced intervals in parallel relation. By reason of being disposed edgewise with reference to the chains carrying the same the said slats secure a firm purchase upon the bundles of grain and provide for a positive elevation thereof upward upon the carrier-frame and onto the arched supporting-bed 18, as may be plainly seen from Fig. 3 of the drawings. The opposite parallel chains 21 of the endless bundle-carrier 20 are arranged to work over the chain or sprocket wheels 26, mounted on the inner and outer transverse carrier-shafts 27 and 28, respectively, the inner carrier-shaft 27 being mounted transversely within the supporting-frame 1, beneath the inner end portion of the arched bed 18, and the outer carrier-shaft 28 being journaled transversely of the carrier-frame 9, at the extreme outer end thereof. Motion is imparted to the inner carrier-shaft 27 by means of a suitable belt connection from one of the working shafts of the threshing-machine, thereby providing for transferring motion to the endless bundle-carrier to cause the same to travel over the platform of the carrier-frame and the said arched supporting-bed. To provide for maintaining the separate runs of the endless bundle-carrier in substantially parallel relation to the platform 16 and the bed 18, idler-sprockets 29 are arranged within the supporting-frame 1 and are adapted to have the sprocket-chains 21 pass thereover contiguous to the apex of the supporting-bed 18.

The bundles of grain are caused to move endwise upon the bundle-carrier by the dividing-strip 30, which is arranged centrally and longitudinally above the carrier-frame and essentially consists of a pair of alined flat strips 31 and 31ª, arranged endwise with reference to the carrier-frame and provided at their contiguous ends with overlapping ears 32, pivotally connected together by the pivot-pin 33, which permits of the strips or sections 31 and 31ª being folded one upon the other, and at the same time the separate sections of the carrier-frame are being folded together in the manner hereinbefore described. When the separate hinge strips or sections 31 and 31ª of the dividing-strip 30 are extended, the hinge connection thereof is prevented from breaking by means of the locking pin or bolt 34, which is detachably inserted in alined openings in the contiguous meeting ends of the strip-sections and which locking pin or bolt is removed when it is desired to permit the dividing-strip to fold with the carrier-frame.

The outer lower end of the sectional longitudinally-arranged dividing-strip 30 is supported by the transverse supporting-bar 35, arranged at the extreme outer end of the carrier-frame 9 and provided at a point centrally between its ends with a notched rest-lug 35ª, which loosely receives therein the lower outer end of the dividing-strip. The inner upper end of said dividing-strip is pivotally hung from one end of an arched hanger-arm 36, which end of the hanger-arm is embraced by an elongated offset keeper 37, fitted to one side of the dividing-strip and permitting such strip to have a slight play upon the end of said hanger-arm to facilitate the folding of the strip with the folding carrier-frame. The other end of the hanger-arm 36 for the inner end of the dividing-strip is pivotally fastened, as at 38, to the upper side of the transverse bundle-chute 39, which lies above and bridges the outer inclined apron 17 of the supporting-bed 18 and provides a passage-way through which the bundles are compelled to pass to the cutting mechanism.

By reason of supporting the dividing-strip 30 in the manner described it will be understood that when the outer section 9$^b$ of the carrier-frame is folded upward and over the inner section 9$^a$ of said frame the dividing-strip 30 will at the same time freely swing upward on the hinged hanger-arm 36 thereof, inasmuch as the said strip is free to slide through the notched rest-lug 35 of the supporting-bar 34. After the outer section 9$^b$ of the carrier-frame has been swung upward with the dividing-strip in this manner prior to swinging the folded frame-section in the position shown in dotted lines in Fig. 1 of the drawings the locking-pin is removed, so that the dividing-strip may be also folded upon itself or swung entirely back upon the top of the supporting-frame and the contiguous end of the machine-casing, as may be found most convenient when folding the parts for transportation.

The arched supporting-bed 18 forms a rigid base or support for the bundles while being operated upon by the cutting mechanism, and this cutting mechanism essentially consists of a transverse cutter-shaft 40 and a plurality of knife-disks 41, fitted to the shaft and each having a plurality of curved blades 42, which work into the bundles and sever the bands thereof. The knife-disks 41 are arranged at regularly-spaced distances apart and in parallel relation to insure not only the cutting of the bands from the bundles, but also the thorough loosening up of the cut bundles so that the grain will be distributed to the threshing-cylinder in a thoroughly-separated condition. The transverse cutter-shaft 40 is arranged transversely at the top of the supporting-frame 1, substantially in the vertical plane of the apex of the supporting-bed 18, and the extremities of the said cutter-shaft are journaled in the sliding bearing-boxes 43, mounted to work within the flanged guides 44, fitted to the opposite side bars of the inclined outer end portion 7 of the supporting-frame 1. The said side bars of the inclined outer end portion of the supporting-frame are provided at their upper ends with the supporting-arms 45, which receive the upper ends of the oppositely arranged guide-rods 46, secured at their lower ends to the framework and slidably receiving thereon the perforated guide-ears 47, formed integral with the bearing-boxes 43 for the cutter-shaft extremities. Pressure-springs 48 are interposed between the supporting-arms 45 and the upper sides of the sliding bearing-boxes 43 to provide for normally pressing the knives into the bundles, while at the same time permitting the cutter-shaft and the knives thereon to readily yield upward under the pressure of an extra large bundle or upon any tendency of the grain to bunch beneath the cutting mechanism. It will thus be seen that the yielding bearing-supports for the cutter-shaft permit the same to freely adjust itself to the conditions of the grain upon which the knives are operating.

The cutting mechanism is preferably inclosed within a semicylindrical cutter-housing 49, hinged at one edge, as at 50, to the top cover 51 of the supporting-frame and serving to thoroughly shield the cutters, while at the same time permitting of ready access thereto for purposes of adjustment or repair.

To prevent more than one bundle at a time from each side of the dividing-strip 30 passing to the cutting mechanism, there is employed a self-adjusting bundle-trap 52. The said bundle, trap, or "arresting device" as it might be termed, essentially consists of a flat rectangular plate provided at one edge with a pendent curved arresting-flange 53, overhanging the lower edge of the bundle-chute 39, so as to lie within the path of the bundles which are carried through such chute. The other edge of the bundle-trap plate 52 is provided with a hinge-eye 54, detachably receiving the hinge-rod 55, also passing through the separate hinge-eyes 56, fitted to the upper side of the bundle-chute 39 and coöperating with the eye 54 and the rod 55 to provide a detachable hinge connection between the bundle-trap plate and the bundle-chute, whereby said bundle-trap plate may be readily disconnected from the machine should it be desired not to use the same. The said detachable hinge-rod 55 for the bundle-trap plate 52 is provided at one end with an angled arm 57, adapted to be sprung into engagement with the spring-catch 58, fitted on the upper side of the bundle-trap plate 52, contiguous to one end thereof, to provide for locking the hinge-rod in place while in use. By swinging the locking-arm 57 of the hinge-rod out of engagement with the spring-catch 58 said rod may be readily withdrawn from the hinge-eyes to permit of the detachment of the bundle-trap plate.

In the operation of the machine the bundles are carried by the bundle-carrier beneath the arresting-flange of the bundle-trap plate and into the passage-way partly inclosed by the bundle-chute 39. After a bundle has passed beneath the arresting-flange of the bundle-trap plate said plate immediately drops to its normal position and prevents another bundle crowding into the chute until the bands of the preceding bundle have been severed. The self-adjusting bundle-trap plate 52 therefore serves to positively prevent an overcrowding of the cutter, but at this point it will of course be understood that two bundles, respectively at opposite sides of the central dividing-strip 30, may pass at the same time beneath the bundle-trap plate. The loosened grain is tumbled or thrown downwardly upon the inner distributing-apron 19 of the arched supporting-bed by the action of the rotary cutter, and the grain falls from said distributing-apron 19 upon the inclined delivery-pan 60, arranged within the inner end portion of the supporting-frame 1 and projecting into the feeding end of the threshing-machine to provide for evenly distributing or delivering the loosened grain to the thresher-cylinder and its concave. The inclined delivery-pan 60 is supported at its outer upper end upon the transverse hinge-rod 61, thereby leaving the inner end portion of said pan to be adjusted in a vertical direction to provide for changing the inclination of the pan to suit the conditions of the work and insure the proper delivery of the grain to the threshing-cylinder. The inner free end portion of the inclined delivery-pan 60 rests upon the transverse vertically-adjustable supporting-bar 62, the opposite end portions of which bar respectively engage the oppositely-located hanger-plates 63 and 64, fitted, respectively, to opposite sides of the inner vertical end portion 2 of the supporting-frame. The hanger-plate 63, at one side of the supporting-frame, is provided with a vertical series of notches 65, with which one end of the bar 62 may be readily engaged, while the other of said hanger-plates is provided with a vertical series of perforations 66 to detachably receive the other end of said supporting-bar. By reason of the construction described the horizontal supporting-bar 62 may be adjusted vertically in the hanger-plates therefor, thereby securing a corresponding adjustment for the inner free end portion of the delivery-pan 60.

Associated with the inclined delivery-pan 60 for the loosened grain is a rotary beater 67, mounted transversely within the inner end portion of the supporting-frame 1 above the plane of the pan 60 and rotating in a direction to force the grain downward within the feeding end of the threshing-machine casing, so as to prevent the grain from passing on top of the threshing-cylinder.

It will be observed that the shaft of the rotary beater 67 is arranged beyond and in approximately the same inclined plane as the apron 19 of the bed 18, thereby leaving an interval between the said apron and the beater, through which the grain is forced downward by the beater upon the delivery-pan 60. This delivery-pan is located in a plane below both the apron 19 and the beater and intersects the vertical plane of the interval or space between said parts.

At this point it may be explained that by reason of arranging the cutter or cutting mechanism so that its blades project at both sides of the vertical plane of the ridge or apex of the arched supporting-bed 18 the ends of the bundles pass beyond said ridge or apex of the supporting-bed at an angle to the apron 19, and are thus left perfectly free until the bands are cut, thereby placing the bundles in the best possible position for the rotating knives to thoroughly break up and loosen the same and force the loosened grain downward upon said distributing-apron 19.

The operating parts of the machine are set in motion by means of suitable belting driven from the cylinder-shaft of the threshing-machine, as plainly illustrated in the drawings.

From the foregoing it is thought that the construction, operation, and many advantages of the herein-described band-cutter and feeder will be readily apparent to those skilled in the art without further description, and it will be understood that changes in the form, proportion, size, and the minor details of construction within the scope of the appended claims may be resorted to without departing from the spirit or sacrificing any of the advantages of this invention.

Having thus described the invention, what is claimed as new, and desired to be secured by Letters Patent, is—

1. In a band-cutter and feeder, the supporting-frame, an arched bed fitted within the frame, and having inner and outer portions, cutting mechanism operating above the apex of the bed, a bundle-carrier, a rotary beater having its shaft spaced from and substantially alined with the inner inclined apron portion, and a delivery-pan supported in a plane below the intervening interval between the inner apron portion and the rotary beater, substantially as set forth.

2. In a band-cutter and feeder, the supporting-frame having a bed provided with an inner inclined apron portion, cutting mechanism arranged above the bed, a bundle-carrier working from the bed, a rotary beater spaced over and disposed in the same inclined plane as said apron portion of the bed, a delivery-pan arranged in a plane below the intervening interval between said apron portion and the beater, said delivery-pan having a hinged support at one end, and an adjusting device coöperating with the free end of the pan to provide for sustaining the same at variable angles, substantially as set forth.

3. In a band-cutter and feeder, the supporting-frame having a bed therein, the cutter, the bundle-carrier, a bundle-chute bridging the bed at one side of the cutter, and a self-adjusting bundle-trap plate normally resting flat on top of the chute, and having one edge thereof overhanging and forming a partial closure for the receiving side of the chute, substantially as set forth.

4. In a band-cutter and feeder, the supporting-frame having a bed, the cutter, the bundle-carrier, a bundle-chute bridging the bed at one side of the cutter, and a self-adjusting bundle-trap plate, normally resting flat on top of the chute, and provided at its working edge with a pendent curved arresting-flange overhanging and forming a partial closure for the receiving side of the chute, substantially as set forth.

5. In a band-cutter and feeder, the supporting-frame having a bed therein, the rotary cutter, a carrier, a bundle-chute bridging the bed at one side of the cutter, a self-adjusting bundle-trap plate arranged on top of the chute, and having a pendent arresting-flange at one edge, a hinge-rod detachably connecting the other edge of the plate with the chute, said hinge-rod having a locking-arm, and a catch carried by the plate and adapted to be engaged by said locking-arm, substantially as set forth.

6. In a band-cutter and feeder, the supporting-frame having an inclined lower side portion, a folding carrier-frame hinged to the supporting-frame, and adapted to fold beneath the inclined lower portion thereof, a folding dividing-strip supported above the carrier-frame, and foldable therewith, the bundle-carrier, and brace-bars adjustably connected at one end with one of the sections of the carrier-frame, and detachably fitted at their other ends with the supporting-frame, substantially as set forth.

7. In a band-cutter and feeder, the supporting-frame, a folding carrier-frame hinged to the supporting-frame, a sectional folding dividing-strip supported centrally and longitudinally above the carrier-frame, the cutting mechanism and the bundle-carrier, substantially as set forth.

8. In a band-cutter and feeder, the supporting-frame, a folding carrier-frame hinged to the supporting-frame, a sectional folding dividing-strip arranged centrally and longitudinally above the carrier-frame, a lock device to secure the sections of the dividing-strip in their extended positions, the cutting mechanism, and the bundle-carrier, substantially as set forth.

9. In a band-cutter and feeder, the combination with the supporting-frame, of a carrier-frame mounted on the supporting-frame and provided at its outer end with a rest, a dividing-strip arranged centrally and longitudinally above the carrier-frame and having its outer end portion loosely engaging with said rest, said dividing-strip comprising separate flat sections hinged together at their contiguous ends, a lock device or fastening detachably engaging the hinge ends of the strip-sections when extended, and a hanger-arm connected at one end to the inner end of the sectional dividing-strip and having a hinge-support at its other end to a fixed part of the machine, the cutting mechanism, and the bundle-carrier, substantially as set forth.

In testimony that I claim the foregoing as my own I have hereto affixed my signature in the presence of two witnesses.

WILLIAM C. WILKA.

Witnesses:
E. L. PARTCH,
B. L. RICHARDS.